US012809599B2

(12) United States Patent
Davuluri et al.

(10) Patent No.: US 12,809,599 B2
(45) Date of Patent: Nov. 24, 2026

(54) SYSTEM AND METHOD FOR DESIGNING USER INTERFACES IN METAVERSE

(71) Applicant: Bank of America Corporation, Charlotte, NC (US)

(72) Inventors: Sudha Davuluri, Simi Valley, CA (US); Kalyan Chakravarthy Pallapolu, Hyderabad (IN); Gondi Mahesh, Hyderabad (IN); Gali Mohan Sreenivas, Tirupati (IN)

(73) Assignee: Bank of America Corporation, Charlotte, NC (US)

( * ) Notice: Subject to any disclaimer, the term of this patent is extended or adjusted under 35 U.S.C. 154(b) by 386 days.

(21) Appl. No.: 18/321,586

(22) Filed: May 22, 2023

(65) Prior Publication Data

US 2024/0394024 A1 Nov. 28, 2024

(51) Int. Cl.

*G06F 8/38* (2018.01)
*G06F 3/01* (2006.01)
*G06F 8/36* (2018.01)
*G06T 19/20* (2011.01)

(52) U.S. Cl.

CPC ................ *G06F 8/38* (2013.01); *G06F 3/011* (2013.01); *G06F 8/36* (2013.01); *G06T 19/20* (2013.01)

(58) Field of Classification Search

None
See application file for complete search history.

(56) References Cited

U.S. PATENT DOCUMENTS

| | | | | |
|---|---|---|---|---|
| 8,386,918 | B2 | 2/2013 | Do et al. | |
| 8,441,475 | B2 | 5/2013 | Hamilton, II et al. | |
| 9,047,690 | B2 | 6/2015 | Haswell et al. | |
| 9,338,200 | B2 | 5/2016 | Park et al. | |
| 9,378,296 | B2 | 6/2016 | Clarke | |
| 10,203,762 | B2 | 2/2019 | Bradski et al. | |
| 10,325,417 | B1 | 6/2019 | Scapel et al. | |
| 10,356,216 | B2 | 7/2019 | Khalid et al. | |
| 10,504,290 | B2 | 12/2019 | Rogers | |
| 10,551,993 | B1 | 2/2020 | Sanocki et al. | |
| 10,679,411 | B2 | 6/2020 | Ziman | |
| 11,017,611 | B1 * | 5/2021 | Mount | G06V 20/20 |
| 11,538,213 | B2 | 12/2022 | Rowley | |
| 11,914,581 | B2 * | 2/2024 | McWilliams | G06F 16/9032 |
| 12,190,420 | B2 * | 1/2025 | Kang | G06F 3/167 |
| 2013/0296043 | A1 * | 11/2013 | Weinshanker | A63F 13/63 463/30 |
| 2018/0095635 | A1 | 4/2018 | Valdivia et al. | |

(Continued)

*Primary Examiner* — Christopher J Fibbi

(57) ABSTRACT

A method for designing user interfaces in metaverse includes opening a metaverse session. An avatar is generated for a user. The user is allowed access to the metaverse session using the avatar. A keyword and a desired technology for a desired user interface (UI) template are received from the user. The keyword includes information about the desired UI template. An UI template repository is searched using the keyword to identify suggested pre-defined UI templates among a plurality of pre-defined UI templates stored in the UI template repository. The suggested pre-defined UI templates are displayed. If at least one of the suggested pre-defined UI templates is acceptable is determined. In response to determining that the least one of the suggested pre-defined UI templates is acceptable, the acceptable pre-defined UI template is identified.

14 Claims, 3 Drawing Sheets

(56) References Cited

U.S. PATENT DOCUMENTS

| | | | | |
|---|---|---|---|---|
| 2022/0179665 | A1* | 6/2022 | Rathod | G06F 9/451 |
| 2022/0188810 | A1 | 6/2022 | Doney | |
| 2022/0248955 | A1 | 8/2022 | Tran | |
| 2024/0143149 | A1* | 5/2024 | Duperron | G06F 3/0482 |
| 2024/0283648 | A1* | 8/2024 | Richter | H04L 9/0861 |

* cited by examiner

SYSTEM AND METHOD FOR DESIGNING USER INTERFACES IN METAVERSE

TECHNICAL FIELD

The present disclosure relates generally to a virtual environment, and more specifically to a system and method for designing user interfaces in metaverse.

BACKGROUND

Designing user interfaces (UI) of metaverse applications is a challenging process as it requires meticulous skills to meet the requirements of end users. Generally, developers design and code UIs from scratch, which is a time-consuming and computing resource-consuming process.

SUMMARY

The system described in the present disclosure provides several practical applications and technical advantages that overcome the current technical problems with designing user interfaces of metaverse applications.

In general, a system for designing user interfaces in metaverse comprises a user device, a metaverse server, a user interface (UI) designing system, a token generator, and a code repository operably coupled to each other via a network. The metaverse server opens a metaverse session and generates an avatar for a user. The metaverse server allows the user access to the metaverse session using the avatar. The metaverse server receives a keyword for a desired UI template from the user device of the user. The keyword includes an information about the desired UI template. In certain embodiments, the keyword may comprise "login page," "signup page," or the like. The metaverse server receives a desired technology for the desired UI template. The desired technology may include HTML, python, and/or java.

The UI designing system receives the keyword from the metaverse server and searches an UI template repository of the UI designing system for the desired UI template using the keyword. The UI designing system identifies suggested pre-defined UI templates among pre-defined UI templates stored in the UI template repository. The token generator receives the suggested pre-defined UI templates and attaches tokens to the suggested pre-defined UI templates. In certain embodiments, the tokens are non-fungible tokens (NFTs).

The metaverse server receives the suggested pre-defined UI templates (with the attached tokens) from the token generator and displays the suggested pre-defined UI templates (with the attached tokens) within the metaverse session. The metaverse server determines if at least one of the suggested pre-defined UI templates is acceptable.

In response to determining that the at least one of the suggested pre-defined UI templates is acceptable, the code repository identifies metadata files corresponding to the acceptable pre-defined UI template among metadata files stored in the code repository based on the desired technology. In certain embodiments, the code repository receives a request from the metaverse server to identify the metadata files corresponding to the acceptable pre-defined UI template. The request comprises information about the acceptable pre-defined UI template and the desired technology. The metadata files are formatted according to a format that corresponds to the desired technology. The code repository sends the identified metadata files to the user. In one embodiment, the code repository sends the identified metadata files to the user using an email.

In response to determining that the suggested pre-defined UI templates are not acceptable, the token generator receives a blank UI template from the UI designing system and attaches a token to the blank UI template. In certain embodiments, the token is an NFTs. The metaverse server receives the blank UI template (with the attached token) from the token generator and displays the blank UI template (with the attached token) within the metaverse session. The UI designing system searches for desired UI components for the desired UI template using the keyword and identifies suggested UI components among UI components stored in the UI template repository. The metaverse server receives the suggested UI components from the UI designing system and displays the suggested UI components within the metaverse session. The metaverse server identifies acceptable UI components among the suggested UI components and places the acceptable UI components into the blank UI template to generate a custom UI template. The UI designing system receives the custom UI template from the metaverse server, saves the UI template as training data in the UI designing system, and trains an artificial intelligence (AI) model using the training data.

The code repository identifies metadata files corresponding to the custom UI template among metadata files stored in the code repository based on the desired technology. In certain embodiments, the code repository receives a request to identify the metadata files corresponding to the custom UI template. The request comprises information about the custom UI template and the desired technology. The metadata files are formatted according to a format corresponding to the desired technology. The code repository sends the identified metadata files to the user. In one embodiment, the code repository sends the identified metadata files to the user using an email.

The system for designing user interfaces in metaverse allows for efficient designing of user interfaces by using pre-defined user interfaces templates. The system further allows designing custom user interfaces by placing suggested user interface components in a blank user interface template. By using the pre-defined user interfaces templates and/or user interface components, computing resources (e.g., CPU load, memory, and/or network bandwidth) that otherwise would be used while designing the pre-defined user interfaces templates and/or user interface components from scratch may be saved and used for other applications.

Accordingly, the following disclosure is particularly integrated into practical applications of: (1) efficient designing of user interfaces in metaverse; and (2) improving computing resource utilization of a system for designing user interfaces in metaverse.

In one embodiment, a system includes a user interface (UI) designing system and a metaverse server communicatively coupled to the UI designing system. The UI designing system includes a first memory and a first processor communicatively coupled to the first memory. The first memory is configured to store an UI template repository. The UI template repository includes a plurality of pre-defined UI templates, a plurality of UI components, and a blank UI template. The first processor implements an artificial intelligence (AI) model. The first processor is configured to receive a keyword from a metaverse server. The keyword includes information about a desired UI template. The first processor is further configured to search the UI template repository using the keyword to identify suggested pre-defined UI templates among the plurality of pre-defined UI templates and search the UI template repository using the keyword to identify suggested UI components among the plurality of UI components. The metaverse server includes a second processor. The second processor is configured to open a metaverse session, generate an avatar for a user, allow the user access to the metaverse session using the avatar, receive the keyword and a desired technology for the desired UI template from the user, receive the suggested pre-defined UI templates, display the suggested pre-defined UI templates, determine if at least one of the suggested pre-defined UI templates is acceptable, and in response to determining that the least one of the suggested pre-defined UI templates is acceptable, identify the acceptable pre-defined UI template.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, where like reference numerals represent like parts.

DETAILED DESCRIPTION

Figure 1:
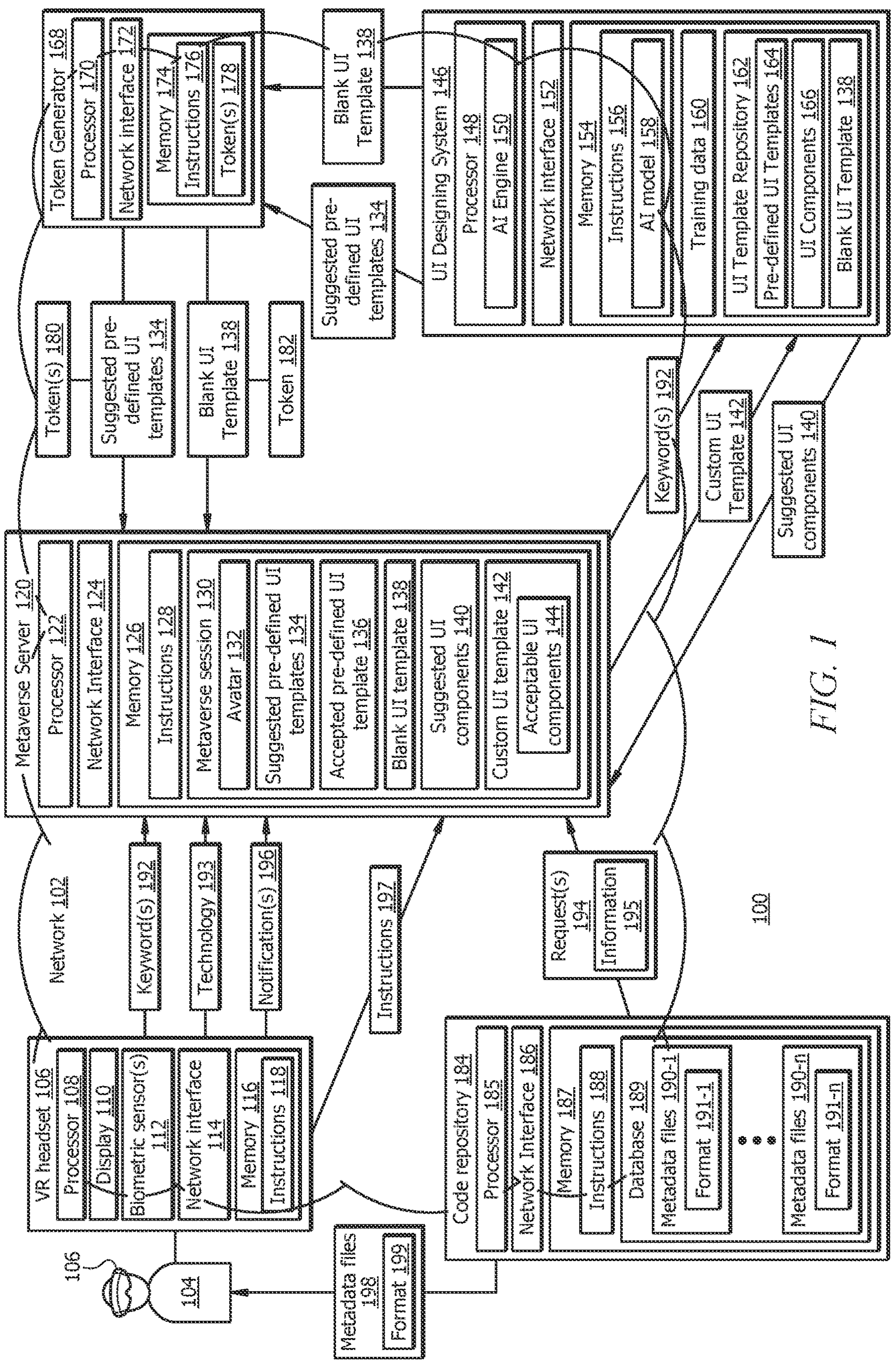
FIG. 1 illustrates an embodiment of a system for designing user interfaces in metaverse.
Figure 2A:
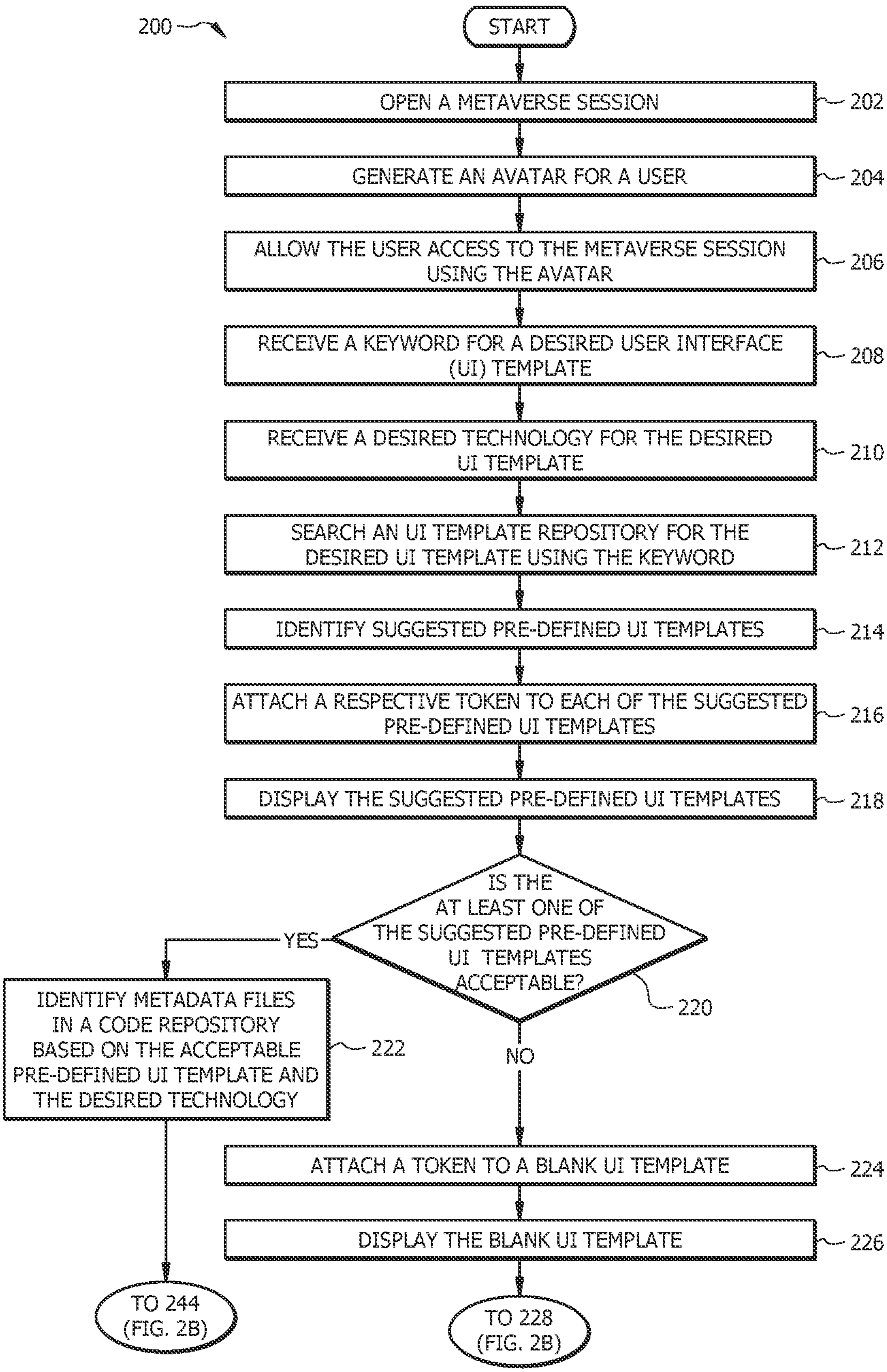
FIGS. 2A and 2B illustrate an example operational flow of system of FIG. 1 for designing user interfaces in metaverse.
Figure 2B:
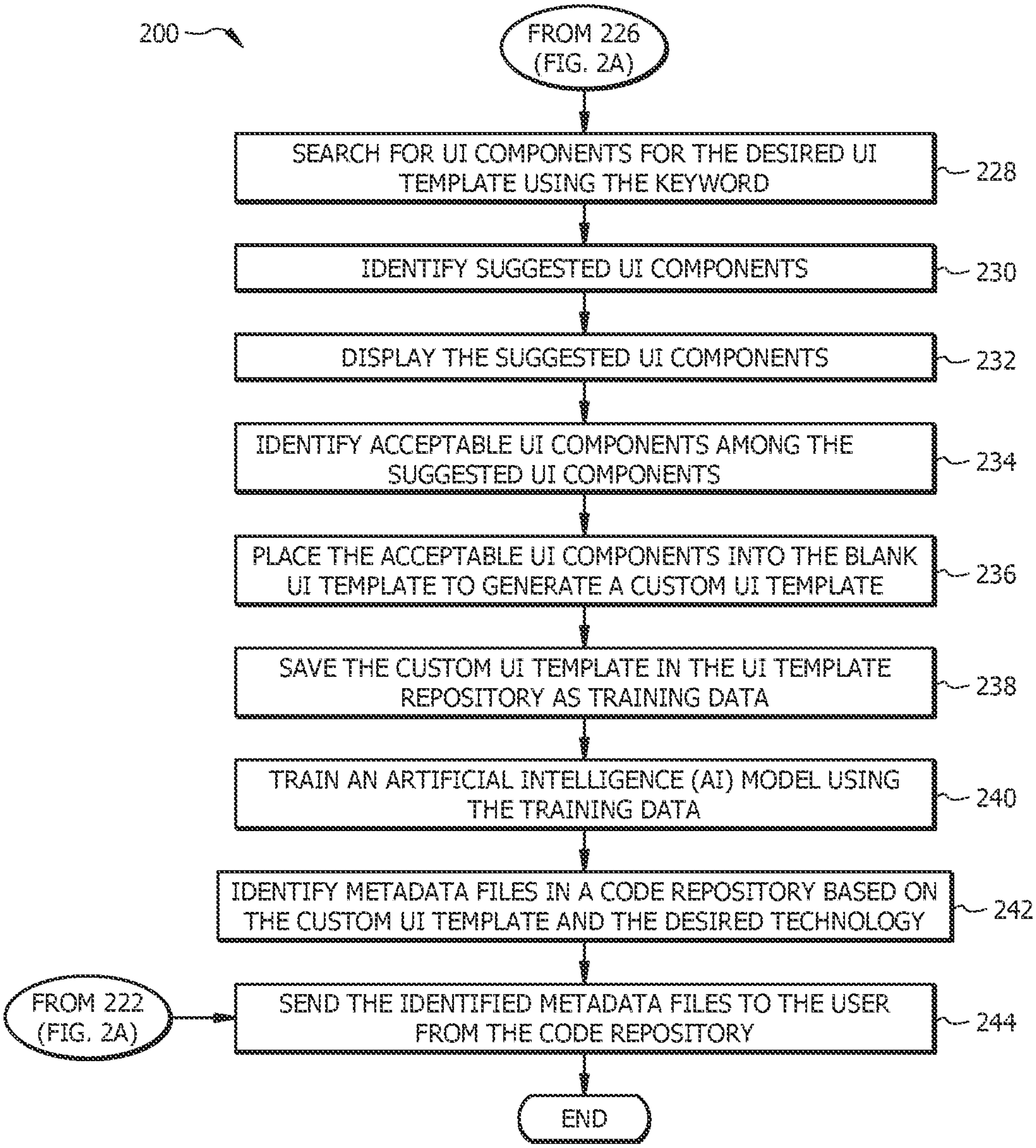

As described above, previous technologies fail to provide effective systems and methods for designing user interfaces in metaverse. Embodiments of the present disclosure and their advantages may be understood by referring to FIGS. 1, 2A and 2B. FIGS. 1, 2A and 2B are used to describe a system and method for designing user interfaces in metaverse.

System Overview

FIG. 1 illustrates an embodiment of a system 100 for designing user interfaces in metaverse. In certain embodiments, the system 100 comprises a user device 106, a metaverse server 120, a user interface (UI) designing system 146, a token generator 168, and a code repository 184 operably coupled to each other via a network 102. Network 102 enables the communication between the components of the system 100. In other embodiments, the system 100 may not have all the components listed and/or may have other elements instead of, or in addition to, those listed above. For example, the metaverse server 120, the UI designing system 146, the token generator 168, and/or the code repository 184 may be integrated into a single system.

In general, the metaverse server 120 opens a metaverse session 130, generates an avatar 132 for a user, and allows the user 104 access to the metaverse session 130 using the avatar 132. The metaverse server 120 receives a keyword 192 and a desired technology 193 for a desired user interface (UI) template from the user device 106 of the user 104. The keyword 192 includes an information about the desired UI template. The keyword 192 may comprise "login page," "signup page," or the like. The desired technology 193 may include HTML, python, and/or java.

The UI designing system 146 receives the keyword 192 from the metaverse server 120, searches an UI template repository 162 of the UI designing system 146 for the desired UI template using the keyword 192, and identifies suggested pre-defined UI templates 134 among pre-defined UI templates 164 stored in the UI template repository 162.

The token generator 168 receives the suggested pre-defined UI templates 134 and attaches tokens 180 to the suggested pre-defined UI templates 134. In certain embodiments, the tokens 180 are non-fungible tokens (NFTs). The metaverse server 120 receives the suggested pre-defined UI templates 134 (with the attached tokens 180) from the token generator 168 and displays the suggested pre-defined UI templates 134 (with the attached tokens 180) within the metaverse session 130.

The metaverse server 120 determines if at least one of the suggested pre-defined UI templates 134 is acceptable. In response to determining that the at least one of the suggested pre-defined UI templates 134 is acceptable, the code repository 184 identifies metadata files 198 corresponding to the acceptable pre-defined UI template 136 to among metadata files 190-1 through **190-*n* stored in the code repository 184 based on the desired technology 193. In certain embodiments, the code repository 184 receives a request 194 to identify the metadata files 198 corresponding to the acceptable pre-defined UI template 136. The request 194 comprises information 195 about the acceptable pre-defined UI template 136 and the desired technology 193. The metadata files 198 are formatted according to a format 199. In certain embodiments, the format 199 corresponds to the desired technology 193. The code repository 184 sends the identified metadata files 198 to the user 104. In one embodiment, the processor 185 of the code repository 184 sends the identified metadata files 198 to the user 104** using an email.

In response to determining the suggested pre-defined UI templates 134 are not acceptable, the token generator 168 receives a blank UI template 138 from the UI designing system 146 and attaches the token 182 to the blank UI template 138. In certain embodiments, the token 182 is an NFTs. The metaverse server 120 receives the blank UI template 138 (with the attached token 182) from the token generator 168 and displays the blank UI template 138 (with the attached token 182) within the metaverse session 130.

The UI designing system 146 searches for desired UI components for the desired UI template using the keyword 192 and identifies suggested UI components 140 among UI components 166 stored in the UI template repository 162. The metaverse server 120 receives the suggested UI components 140 from the UI designing system 146 and displays the suggested UI components 140 within the metaverse session 130. The metaverse server 120 identifies acceptable UI components 144 among the suggested UI components 140 and places the acceptable UI components 144 into the blank UI template 138 to generate a custom UI template 142.

The UI designing system 146 receives the custom UI template 142 from the metaverse server 120, saves the UI template 142 as training data 160 in a memory 154 of the UI designing system 146, and trains an artificial intelligence (AI) model 158 using the training data 160.

The code repository 184 identifies metadata files 198 corresponding to the custom UI template 142 among metadata files 190-1 through **190-*n* stored in the code repository 184 based on the desired technology 193. In certain embodiments, the code repository 184 receives a request 194 to identify the metadata files 198 corresponding to the custom UI template 142. The request 194 comprises information 195 about the custom UI template 142 and the desired technology 193. The metadata files 198 are formatted according to a format 199. In certain embodiments, the format 199 corresponds to the desired technology 193. The code repository 184 sends the identified metadata files 198 to the user 104. In one embodiment, the code repository 184 sends the identified metadata files 198 to the user 104** using an email.

System Components

Network

Network 102 may be any suitable type of wireless and/or wired network. The network 102 may or may not be connected to the Internet or public network. The network 102 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMax, etc.), a long-term evolution (LTE) network, a universal mobile telecommunications system (UMTS) network, a peer-to-peer (P2P) network, a Bluetooth network, a near field communication (NFC) network, and/or any other suitable network. The network 102 may be configured to support any suitable type of communication protocol as would be appreciated by one of ordinary skill in the art.

User Device

The user device 106 is generally any device that is configured to process data and interact with a user 104. Examples of a user device include, but are not limited to, a personal computer, a desktop computer, a workstation, a server, a laptop, a tablet computer, a mobile phone (such as a smartphone), a virtual reality (VR) headset, etc. The user device 106 may include a user interface, such as a display 110, a microphone, a speaker, a keypad, or other appropriate terminal equipment usable by the user 104. The user device 106 may further include one or more biometric sensors 112. The biometric sensors 112 may include an iris scanner and/or a fingerprint scanner. In one embodiment, the user device 106 is a VR headset. The user 104 may be a developer designing UIs of metaverse applications.

The user device 106 may comprise a processor 108 in signal communication with a memory 116 and a network interface 114. The processor 108 comprises one or more processors operably coupled to the memory 116. The processor 108 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 108 may be a programmable logic device, a microcontroller, a microprocessor, or any suitable combination of the preceding. The one or more processors are configured to process data and may be implemented in hardware or software. For example, each of the processor 108 may be 8-bit, 16-bit, 32-bit, 64-bit, or of any other suitable architecture. The one or more processors are configured to implement various software instructions to perform the operations described herein. For example, the one or more processors are configured to execute software instructions 118 and perform one or more functions described herein.

The network interface 114 is configured to enable wired and/or wireless communications (e.g., via network 102). The network interface 114 is configured to communicate data between the user device 106 and other components of the system 100. For example, the network interface 114 may comprise a WIFI interface, a local area network (LAN) interface, a wide area network (WAN) interface, a modem, a switch, or a router. The processor 108 is configured to send and receive data using the network interface 114. The network interface 114 may be configured to use any suitable type of communication protocol as would be appreciated by one of ordinary skill in the art.

The memory 116 may be volatile or non-volatile and may comprise a read-only memory (ROM), random-access memory (RAM), ternary content-addressable memory (TCAM), dynamic random-access memory (DRAM), and static random-access memory (SRAM). The memory 116 may be implemented using one or more disks, tape drives, solid-state drives, and/or the like. The memory 116 may store any of the information described in FIGS. 1, 2A and 2B along with any other data, instructions, logic, rules, or code operable to implement the function(s) described herein when executed by the processor 108. The memory 116 is operable to store the software instructions 118, and/or any other data and instructions. The software instructions 118 may comprise any suitable set of software instructions, logic, rules, or code operable to be executed by the processor 108.

In operation, the user device 106 is configured to access the metaverse session 130 hosted by the metaverse server 120 using an avatar 132. The user device 106 is further configured to send a keyword 192 and a technology 193 for a desired user interface (UI) template to the metaverse server 120. The keyword 192 includes an information about the desired UI template. In certain embodiments, the keyword 192 may comprise "login page," "signup page," or the like. The technology 193 may include HTML, python, and/or java. The user device 106 is further configured to send various notifications 196 and instructions 197 to the metaverse server 120.

Metaverse Server

The metaverse server 120 is generally any device that is configured to process data and communicate with other components of the system 100 via the network 102. The metaverse server 120 may comprise a processor 122 in signal communication with a memory 126 and a network interface 124.

Processor 122 comprises one or more processors operably coupled to the memory 126. The processor 122 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 122 may be a programmable logic device, a microcontroller, a microprocessor, or any suitable combination of the preceding. The one or more processors are configured to process data and may be implemented in hardware or software. For example, the processor 122 may be 8-bit, 16-bit, 32-bit, 64-bit, or of any other suitable architecture. The one or more processors are configured to implement various software instructions to perform the operations described herein. For example, the one or more processors are configured to execute software instructions 128 and perform one or more functions described herein.

Network interface 124 is configured to enable wired and/or wireless communications (e.g., via network 102). The network interface 124 is configured to communicate data between the metaverse server 120 and other components of the system 100. For example, the network interface 124 may comprise a WIFI interface, a local area network (LAN) interface, a wide area network (WAN) interface, a modem, a switch, or a router. The processor 122 is configured to send and receive data using the network interface 124. The network interface 124 may be configured to use any suitable type of communication protocol as would be appreciated by one of ordinary skill in the art.

Memory 126 may be volatile or non-volatile and may comprise a read-only memory (ROM), random-access memory (RAM), ternary content-addressable memory (TCAM), dynamic random-access memory (DRAM), and static random-access memory (SRAM). Memory 126 may be implemented using one or more disks, tape drives, solid-state drives, and/or the like. The memory 126 may store any of the information described in FIGS. 1, 2A and 2B along with any other data, instructions, logic, rules, or code operable to implement the function(s) described herein. The memory 126 is operable to store software instructions 128, and/or any other data and instructions. The software instructions 128 may comprise any suitable set of software instructions, logic, rules, or code operable to be executed by the processor 122. Memory 126 may further store one or more metaverse sessions (e.g., metaverse session 130).

In operation, the processor 122 of the metaverse server 120 opens a metaverse session 130, generates an avatar 132 for the user 104, and allows the user 104 access to the metaverse session 130 using the avatar 132. The processor 122 of the metaverse server 120 receives a keyword 192 and a desired technology 193 for a desired user interface (UI) template from the user device 106 of the user 104. The keyword 192 includes an information about the desired UI template. In certain embodiments, the keyword 192 may comprise "login page," "signup page," or the like. The desired technology 193 may include HTML, python, and/or java.

The processor 122 of the metaverse server 120 sends the keyword 192 to the UI designing system 146, receives suggested pre-defined UI templates 134 (with the attached tokens 180) from the token generator 168, displays the suggested pre-defined UI templates 134 (with the attached tokens 180) within the metaverse session 130, and determines if at least one of the suggested pre-defined UI templates 134 is acceptable. In response to determining that the at least one of the suggested pre-defined UI templates 134 is acceptable, the processor 122 of the metaverse server 120 sends a request 194 to the code repository 184 to identify metadata files 198 corresponding to the acceptable pre-defined UI template 136. The request 194 comprises information 195 about the acceptable pre-defined UI template 136 and the desired technology 193.

In response to determining the suggested pre-defined UI templates 134 are not acceptable, the processor 122 of the metaverse server 120 receives a blank UI template 138 (with the attached token 182) from the token generator 168 and displays the blank UI template 138 (with the attached token 182) within the metaverse session 130. The processor 122 of the metaverse server 120 receives the suggested UI components 140 from the UI designing system 146, displays the suggested UI components 140 within the metaverse session 130, identifies acceptable UI components 144 among the suggested UI components 140, and places the acceptable UI components 144 into the blank UI template 138 to generate a custom UI template 142. The processor 122 of the metaverse server 120 sends the custom UI template 142 to the UI designing system 146.

UI Designing System

The UI designing system 146 is generally any device that is configured to process data and communicate with other components of the system 100 via the network 102. The UI designing system 146 may comprise a processor 148 in signal communication with a memory 154 and a network interface 152.

Processor 148 comprises one or more processors operably coupled to the memory 154. The processor 148 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 148 may be a programmable logic device, a microcontroller, a microprocessor, or any suitable combination of the preceding. The one or more processors are configured to process data and may be implemented in hardware or software. For example, the processor 148 may be 8-bit, 16-bit, 32-bit, 64-bit, or of any other suitable architecture. The one or more processors are configured to implement various software instructions to perform the operations described herein. For example, the one or more processors are configured to execute software instructions 156 and perform one or more functions described herein.

Network interface 152 is configured to enable wired and/or wireless communications (e.g., via network 102). The network interface 152 is configured to communicate data between the UI designing system 146 and other components of the system 100. For example, the network interface 152 may comprise a WIFI interface, a local area network (LAN) interface, a wide area network (WAN) interface, a modem, a switch, or a router. The processor 148 is configured to send and receive data using the network interface 152. The network interface 152 may be configured to use any suitable type of communication protocol as would be appreciated by one of ordinary skill in the art.

Memory 154 may be volatile or non-volatile and may comprise a read-only memory (ROM), random-access memory (RAM), ternary content-addressable memory (TCAM), dynamic random-access memory (DRAM), and static random-access memory (SRAM). Memory 154 may be implemented using one or more disks, tape drives, solid-state drives, and/or the like. The memory 154 may store any of the information described in FIGS. 1, 2A and 2B along with any other data, instructions, logic, rules, or code operable to implement the function(s) described herein. The memory 154 is operable to store software instructions 156, and/or any other data and instructions. The software instructions 156 may comprise any suitable set of software instructions, logic, rules, or code operable to be executed by the processor 148. In certain embodiments, the software instructions 156 may comprise an artificial intelligence (AI) model 158 operable to be executed by the processor 148 to implement an AI engine 150.

The memory 154 may further store training data 160 and an UI template repository 162. The UI template repository 162 may include pre-defined UI templates 164, UI components 166, and a blank UI template 138.

In operation, the processor 148 of the UI designing system 146 receives the keyword 192 from the metaverse server 120, searches an UI template repository 162 of the UI designing system 146 for the desired UI template using the keyword 192, identifies suggested pre-defined UI templates 134 among pre-defined UI templates 164 stored in the UI template repository 162, and sends the suggested pre-defined UI templates 134 to the token generator 168.

The processor 148 of the UI designing system 146 searches for desired UI components for the desired UI template using the keyword 192, identifies suggested UI components 140 among UI components 166 stored in the UI template repository 162, and sends the suggested UI components 140 to the metaverse server 120.

The processor 148 of the UI designing system 146 receives the custom UI template 142 from the metaverse server 120, saves the UI template 142 as training data 160 in a memory 154 of the UI designing system 146, and trains an artificial intelligence (AI) model 158 using the training data 160.

Token Generator

The token generator 168 is generally any device that is configured to process data and communicate with other components of the system 100 via the network 102. The token generator 168 may comprise a processor 170 in signal communication with a memory 174 and a network interface 172.

Processor 170 comprises one or more processors operably coupled to the memory 174. The processor 170 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 170 may be a programmable logic device, a microcontroller, a microprocessor, or any suitable combination of the preceding. The one or more processors are configured to process data and may be implemented in hardware or software. For example, the processor 170 may be 8-bit, 16-bit, 32-bit, 64-bit, or of any other suitable architecture. The one or more processors are configured to implement various software instructions to perform the operations described herein. For example, the one or more processors are configured to execute software instructions 176 and perform one or more functions described herein.

Network interface 172 is configured to enable wired and/or wireless communications (e.g., via network 102). The network interface 172 is configured to communicate data between the token generator 168 and other components of the system 100. For example, the network interface 172 may comprise a WIFI interface, a local area network (LAN) interface, a wide area network (WAN) interface, a modem, a switch, or a router. The processor 170 is configured to send and receive data using the network interface 172. The network interface 172 may be configured to use any suitable type of communication protocol as would be appreciated by one of ordinary skill in the art.

Memory 174 may be volatile or non-volatile and may comprise a read-only memory (ROM), random-access memory (RAM), ternary content-addressable memory (TCAM), dynamic random-access memory (DRAM), and static random-access memory (SRAM). Memory 174 may be implemented using one or more disks, tape drives, solid-state drives, and/or the like. The memory 174 may store any of the information described in FIGS. 1, 2A and 2B along with any other data, instructions, logic, rules, or code operable to implement the function(s) described herein. The memory 174 is operable to store software instructions 176, and/or any other data and instructions. The software instructions 176 may comprise any suitable set of software instructions, logic, rules, or code operable to be executed by the processor 170.

In operation, the token generator 168 is configured to generate tokens 178. In certain embodiments, tokens 178 are non-fungible tokens (NFTs). The processor 170 of the token generator 168 receives the suggested pre-defined UI templates 134 from the UI designing system 146, attaches tokens 180 to the suggested pre-defined UI templates 134, and sends the suggested pre-defined UI templates 134 (with attached tokens 180) to the metaverse server 120. The processor 170 of the token generator 168 receives the blank UI template 138 from the UI designing system 146, attaches a token 182 to the blank UI template 138, and sends the blank UI template 138 (with the attached token 182) to the metaverse server 120.

Code Repository

The code repository 184 is generally any device that is configured to process data and communicate with other components of the system 100 via the network 102. The code repository 184 may comprise a processor 185 in signal communication with a memory 187 and a network interface 186.

Processor 185 comprises one or more processors operably coupled to the memory 187. The processor 185 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 185 may be a programmable logic device, a microcontroller, a microprocessor, or any suitable combination of the preceding. The one or more processors are configured to process data and may be implemented in hardware or software. For example, the processor 185 may be 8-bit, 16-bit, 32-bit, 64-bit, or of any other suitable architecture. The one or more processors are configured to implement various software instructions to perform the operations described herein. For example, the one or more processors are configured to execute software instructions 188 and perform one or more functions described herein.

Network interface 186 is configured to enable wired and/or wireless communications (e.g., via network 102). The network interface 186 is configured to communicate data between the code repository 184 and other components of the system 100. For example, the network interface 186 may comprise a WIFI interface, a local area network (LAN) interface, a wide area network (WAN) interface, a modem, a switch, or a router. The processor 185 is configured to send and receive data using the network interface 186. The network interface 186 may be configured to use any suitable type of communication protocol as would be appreciated by one of ordinary skill in the art.

Memory 187 may be volatile or non-volatile and may comprise a read-only memory (ROM), random-access memory (RAM), ternary content-addressable memory (TCAM), dynamic random-access memory (DRAM), and static random-access memory (SRAM). Memory 187 may be implemented using one or more disks, tape drives, solid-state drives, and/or the like. The memory 187 may store any of the information described in FIGS. 1, 2A and 2B along with any other data, instructions, logic, rules, or code operable to implement the function(s) described herein. The memory 187 is operable to store software instructions 188, and/or any other data and instructions. The software instructions 188 may comprise any suitable set of software instructions, logic, rules, or code operable to be executed by the processor 185.

The memory 187 may further store a database 189. The database 189 may include metadata files 190-1 through **190-*n*. The metadata files 190-1 through 190-*n* correspond to respective UI templates. The metadata files 190-1 through 190-*n* may be formatted according to formats 191-1 through 191-*n*, respectively. The formats 191-1 through 191-*n* may correspond to a technology desired by the user 104. The formats 191-1 through 191-*n*** may include formats of HTML, python, and/or java.

In operation, the processor 185 of the code repository 184 identifies metadata files 198 corresponding to the acceptable pre-defined UI template 136 among metadata files 190-1 through **190-*n* stored in the code repository 184 based on the desired technology 193. In certain embodiments, the processor 185 of the code repository 184 receives a request 194 from the metaverse server 120 to identify the metadata files 198 corresponding to the acceptable pre-defined UI template 136. The request 194 comprises information 195 about the acceptable pre-defined UI template 136 and the desired technology 193. The metadata files 198 are formatted according to a format 199. In certain embodiments, the format 199 corresponds to the desired technology 193. The processor 185 of the code repository 184 sends the identified metadata files 198 to the user 104. In one embodiment, the processor 185 of the code repository 184 sends the identified metadata files 198 to the user 104** using an email.

In other embodiments, the processor 185 of the code repository 184 identifies metadata files 198 corresponding to the custom UI template 142 among metadata files 190-1 through **190-*n* stored in the code repository 184 based on the desired technology 193. In certain embodiments, the processor 185 of the code repository 184 receives a request 194 to identify the metadata files 198 corresponding to the custom UI template 142. The request 194 comprises information 195 about the custom UI template 142 and the desired technology 193. The metadata files 198 are formatted according to a format 199. In certain embodiments, the format 199 corresponds to the desired technology 193. The processor 185 of the code repository 184 sends the identified metadata files 198 to the user 104. In one embodiment, the processor 185 of the code repository 184 sends the identified metadata files 198 to the user 104** using an email.

Example Method for Designing User Interfaces in Metaverse

FIGS. 2A and 2B illustrate an example flowchart of a method 200 for designing user interfaces in metaverse. Modifications, additions, or omissions may be made to method 200. Method 200 may include more, fewer, or other operations. For example, operations may be performed in parallel or in any suitable order. For example, one or more operations of method 200 may be implemented, at least in part, in the form of the software instructions (e.g., instructions 118, 128, 156, 176, and/or 188 of FIG. 1), stored on non-transitory, tangible, machine-readable medium (e.g., memories 116, 126, 154, 174, and/or 187 of FIG. 1) that when executed by one or more processors (e.g., processors 108, 122, 148, 170, and/or 185 of FIG. 1) may cause the one or more processors to perform operations 202-244.

The method 200 starts at operation 202, where a processor 122 of a metaverse server 120 opens a metaverse session 130.

At operation 204, the processor 122 of the metaverse server 120 generates an avatar 132 for a user 104.

At operation 206, the processor 122 of the metaverse server 120 allows the user 104 access to the metaverse session 130 using the avatar 132.

At operation 208, the processor 122 of the metaverse server 120 receives a keyword 192 for a desired user interface (UI) template from a user device 106 of the user 104. The keyword 192 includes an information about the desired UI template. In certain embodiments, the keyword 192 may comprise "login page," "signup page," or the like.

At operation 210, the processor 122 of the metaverse server 120 receives a desired technology 193 for the desired UI template from the user device 106 of the user 104. The desired technology 193 may include HTML, python, and/or java.

At operation 212, a processor 148 of an UI designing system 146 receives the keyword 192 from the metaverse server 120 and searches an UI template repository 162 of the UI designing system 146 for the desired UI template using the keyword 192.

At operation 214, the processor 148 of the UI designing system 146 identifies suggested pre-defined UI templates 134 among pre-defined UI templates 164 stored in the UI template repository 162.

At operation 216, a respective token (e.g., respective one of tokens 180) is attached to each of the suggested pre-defined UI templates 134. In certain embodiments, a processor 170 of a token generator 168 receives the suggested pre-defined UI templates 134 from the UI designing system) 146 and attaches tokens 180 to the suggested pre-defined UI templates 134. In certain embodiments, tokens 180 are non-fungible tokens (NFTs).

At operation 218, the processor 122 of the metaverse server 120 receives the suggested pre-defined UI templates 134 (with the attached tokens 180) from the token generator 168 and displays the suggested pre-defined UI templates 134 (with the attached tokens 180) within the metaverse session 130.

At operation 220, the processor 122 of the metaverse server 120 determines if at least one of the suggested pre-defined UI templates 134 is acceptable. In certain embodiments, the processor 122 of the metaverse server 120 receives from the user device 106 of the user 104 a notification 196 indicating if at least one of the suggested pre-defined UI templates 134 is acceptable or not.

In response to determining at operation 220 that the notification 196 indicates that the at least one of the suggested pre-defined UI templates 134 is acceptable, the method 200 continues to operation 222. At operation 222, a processor 185 of a code repository 184 identifies metadata files 198 corresponding to the acceptable pre-defined UI template 136 among metadata files 190-1 through **190-*n* stored in the code repository 184 based on the desired technology 193. In certain embodiments, the processor 185 of the code repository 184 receives a request 194 from the metaverse server 120 to identify the metadata files 198 corresponding to the acceptable pre-defined UI template 136. The request 194 comprises information 195 about the acceptable pre-defined UI template 136 and the desired technology 193. The metadata files 198 are formatted according to a format 199. In certain embodiments, the format 199 corresponds to the desired technology 193. After performing operation 222, the method 200 continues to operation 244**.

At operation 244, the processor 185 of the code repository 184 sends the identified metadata files 198 to the user 104. In one embodiment, the processor 185 of the code repository 184 sends the identified metadata files 198 to the user 104 using an email. In one embodiment, the user 104 receives the identified metadata files 198 in response to payment. The payment process may be authenticated using the biometric sensors 112 of the user device 106. After performing operation 244, the method 200 ends.

In response to determining at operation 220 that the notification 196 indicates that the suggested pre-defined UI templates 134 are not acceptable, the method 200 continues to operation 224. At operation 224, a token 182 is attached to a blank UI template 138. In certain embodiments, the processor 170 of the token generator 168 receives the blank UI template 138 from the UI designing system 146 and attaches the token 182 to the blank UI template 138. In certain embodiments, the token 182 is an NFTs.

At operation 226, the processor 122 of the metaverse server 120 receives the blank UI template 138 (with the attached token 182) from the token generator 168 and displays the blank UI template 138 (with the attached token 182) within the metaverse session 130.

At operation 228, the processor 148 of the UI designing system 146 searches for desired UI components for the desired UI template using the keyword 192.

At operation 230, the processor 148 of the UI designing system 146 identifies suggested UI components 140 among UI components 166 stored in the UI template repository 162.

At operation 232, the processor 122 of the metaverse server 120 receives the suggested UI components 140 from the UI designing system 146 and displays the suggested UI components 140 within the metaverse session 130.

At operation 234, the processor 122 of the metaverse server 120 identifies acceptable UI components 144 among the suggested UI components 140. In certain embodiments, the processor 122 of the metaverse server 120 receives from the user device 106 of the user 104 a notification 196 indicating the acceptable UI components 144.

At operation 236, the processor 122 of the metaverse server 120 places the acceptable UI components 144 into the blank UI template 138 to generate a custom UI template 142. In certain embodiments, the processor 122 of the metaverse server 120 receives from the user device 106 of the user 104 instructions 197 that instruct the processor 122 of the metaverse server 120 to place the acceptable UI components 144 into the blank UI template 138.

At operation 238, the processor 148 of the UI designing system 146 receives the custom UI template 142 from the metaverse server 120 and saves the UI template 142 as training data 160 in a memory 154 of the UI designing system 146.

At operation 240, the processor 148 of the UI designing system 146 trains an artificial intelligence (AI) model 158 using the training data 160.

At operation 242, the processor 185 of the code repository 184 identifies metadata files 198 corresponding to the custom UI template 142 among metadata files 190-1 through **190-*n* stored in the code repository 184 based on the desired technology 193. In certain embodiments, the processor 185 of the code repository 184 receives a request 194 from the metaverse server 120 to identify the metadata files 198 corresponding to the custom UI template 142. The request 194 comprises information 195 about the custom UI template 142 and the desired technology 193. The metadata files 198 are formatted according to a format 199. In certain embodiments, the format 199 corresponds to the desired technology 193**.

At operation 244, the processor 185 of the code repository 184 sends the identified metadata files 198 to the user 104. In one embodiment, the processor 185 of the code repository 184 sends the identified metadata files 198 to the user 104 using an email. In one embodiment, the user 104 receives the identified metadata files 198 in response to payment. The payment process may be authenticated using the biometric sensors 112 of the user device 106. After performing operation 244, the method 200 ends.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:

a user interface (UI) designing system comprising:
- a first memory configured to store:
  - a UI template repository comprising:
    - a plurality of pre-defined UI templates;
    - a plurality of UI components; and
    - a blank UI template; and
- a first processor communicatively coupled to the first memory, the first processor implementing an artificial intelligence (AI) model, wherein the first processor is configured to:
  - receive a keyword from a metaverse server, wherein the keyword comprises information about a desired type of UI template for a metaverse;
  - search the UI template repository using the keyword to identify a plurality of suggested pre-defined UI templates of the desired type for the metaverse among the plurality of pre-defined UI templates defined for the metaverse; and
  - search the UI template repository using the keyword to identify suggested UI components among the plurality of UI components;

a token generator communicatively coupled to the metaverse server and the UI designing system, wherein the token generator comprises:
- a second processor configured to:
  - receive the plurality of suggested pre-defined UI templates from the UI designing system;
  - generate a plurality of Non-Fungible tokens (NFTs), wherein each NFT uniquely identifies a respective suggested pre-defined UI templates;
  - attach a respective NFT to each of the suggested pre-defined UI templates; and
  - transmit the suggested pre-defined UI templates with respective attached NFTs to the metaverse server; and the metaverse server communicatively coupled to the UI designing system, wherein the metaverse server comprises:
- a third processor configured to:
  - open a metaverse session;
  - generate an avatar for a user;

allow the user access to the metaverse session using the avatar;

receive the keyword and a desired technology for the desired UI template from the user;

transmit the keyword to the UI designing system;

receive the plurality of suggested pre-defined UI templates with the respective attached NFTs;

display the plurality of suggested pre-defined UI templates and respective attached NFTs within the metaverse session;

determine that at least one of the plurality of suggested pre-defined UI templates is acceptable;

in response to determining that the least one of the suggested pre-defined UI templates is acceptable:

identify the acceptable pre-defined UI template with the respective attached NFT;

determine that at least one of the suggested pre-defined UI templates is not acceptable;

in response to determining that the at least one of the suggested pre-defined UI templates is not acceptable:

receive the blank UI template from the UI designing system with a respective NFT associated with the blank UI template;

display the blank UI template and the respective NFT associated with the blank UI template within the metaverse session;

receive the suggested UI components from the UI designing system; and generate the custom UI template by placing one or more of the suggested UI components in the blank UI template.

2. The system of claim 1, further comprising:

a code repository communicatively coupled to the metaverse server, wherein the code repository comprises:

a third processor configured to:

receive a first request from the metaverse server to identify first metadata files for the acceptable pre-defined UI template based on the desired technology;

identify the first metadata files; and send the first metadata files to the user.

3. The system of claim 1, further comprising:

a code repository communicatively coupled to the metaverse server, wherein the code repository comprises:

a third processor configured to:

receive a second request from the metaverse server to identify second metadata files for the custom UI template based on the desired technology;

identify the second metadata files; and send the second metadata files to the user.

4. The system of claim 3, wherein the first processor is further configured to:

receive the custom UI template from the metaverse server;

save the custom UI template as training data; and train the AI model using the training data.

5. The system of claim 1, wherein the second processor is further configured to:

receive the blank UI template from the UI designing system;

generate a second token;

attach the second token to the blank UI template; and send the blank UI template with the attached second token to the metaverse server.

6. A method comprising:

opening a metaverse session;

generating an avatar for a user;

allowing the user access to the metaverse session using the avatar;

receiving a keyword and a desired technology for a desired user interface (UI) template from the user, wherein the keyword comprises information about the desired type of UI template for a metaverse;

searching a UI template repository using the keyword to identify a plurality of suggested pre-defined UI templates of the desired type for the metaverse among a plurality of pre-defined UI templates defined for the metaverse stored in the UI template repository;

generating a plurality of Non-Fungible tokens (NFTs), wherein each NFT uniquely identifies a respective suggested pre-defined UI templates;

attach a respective NFT to each of the suggested pre-defined UI templates;

displaying the plurality of suggested pre-defined UI templates and respective attached NFTs within the metaverse session;

determining that at least one of the suggested pre-defined UI templates is acceptable;

in response to determining that the least one of the suggested pre-defined UI templates is acceptable:

identifying the acceptable pre-defined UI template with the respective attached NFT;

determining that at least one of the suggested pre-defined UI templates is not acceptable;

in response to determining that the at least one of the suggested pre-defined UI templates is not acceptable:

obtaining a blank UI template with a respective NFT associated with the blank UI template;

displaying the blank UI template and the respective NFT associated with the blank UI template within the metaverse session;

searching the UI template repository using the keyword to identify suggested UI components among a plurality of UI components; and generating a custom UI template by placing one or more of the suggested UI components in the blank UI template.

7. The method of claim 6, further comprising:

identifying first metadata files for the acceptable pre-defined UI template based on the desired technology; and sending the first metadata files to the user.

8. The method of claim 7, wherein the first metadata files are formatted based on the desired technology.

9. The method of claim 8, further comprising:

identifying second metadata files for the custom UI template based on the desired technology; and sending the second metadata files to the user.

10. The method of claim 8, further comprising:

generating a token; and attaching the token to the blank UI template.

11. A non-transitory computer-readable medium storing instructions that, when executed by one or more processors, cause the one or more processors to:

open a metaverse session;

generate an avatar for a user;

allow the user access to the metaverse session using the avatar;

receive a keyword and a desired technology for a desired user interface (UI) template from the user, wherein the keyword comprises information about the desired type of UI template for a metaverse;

search a UI template repository using the keyword to identify a plurality of suggested pre-defined UI templates of the desired type for the metaverse among a plurality of pre-defined UI templates defined for the metaverse stored in the UI template repository;

generate a plurality of Non-Fungible tokens (NFTs), wherein each NFT uniquely identifies a respective suggested pre-defined UI templates;

attach a respective NFT to each of the suggested pre-defined UI templates;

display the plurality of suggested pre-defined UI templates and respective attached NFTs within the metaverse session;

determine that at least one of the suggested pre-defined UI templates is acceptable;

in response to determining that the least one of the suggested pre-defined UI templates is acceptable:

identify the acceptable pre-defined UI template with the respective attached NFT;

determine that at least one of the suggested pre-defined UI templates is not acceptable;

in response to determining that none of the plurality the at least one of the suggested pre-defined UI templates is not acceptable:

obtain a blank UI template with a respective NFT associated with the blank UI template;

display the blank UI template and the respective NFT associated with the blank UI template within the metaverse session;

search the UI template repository using the keyword to identify suggested UI components among a plurality of UI components; and generate a custom UI template by placing one or more of the suggested UI components in the blank UI template.

12. The non-transitory computer-readable medium of claim 11, wherein the instructions, when executed by the one or more processors, further cause the one or more processors to:

identify first metadata files for the acceptable pre-defined UI template based on the desired technology; and send the first metadata files to the user.

13. The non-transitory computer-readable medium of claim 11, wherein the instructions, when executed by the one or more processors, further cause the one or more processors to:

identify second metadata files for the custom UI template based on the desired technology; and send the second metadata files to the user.

14. The non-transitory computer-readable medium of claim 11, wherein the instructions, when executed by the one or more processors, further cause the one or more processors to:

generate a plurality of tokens; and attach a respective token to each of the suggested pre-defined UI templates.

* * * * *